(12) United States Patent
Weinenger et al.

(10) Patent No.: US 10,344,706 B2
(45) Date of Patent: Jul. 9, 2019

(54) GALLERYLESS PISTON WITH CUTOUT ABOVE PIN BORE

(71) Applicant: FEDERAL-MOGUL LLC, Southfield, MI (US)

(72) Inventors: Michael Weinenger, Southfield, MI (US); Jeffrey L. Riffe, Troy, MI (US)

(73) Assignee: TENNECO INC., Lake Forest, IL (US)

( * ) Notice: Subject to any disclaimer, the term of this patent is extended or adjusted under 35 U.S.C. 154(b) by 2 days.

(21) Appl. No.: 15/448,421

(22) Filed: Mar. 2, 2017

(65) Prior Publication Data

US 2017/0260927 A1  Sep. 14, 2017

Related U.S. Application Data

(60) Provisional application No. 62/305,419, filed on Mar. 18, 2016.

(51) Int. Cl.
*F01P 3/06* (2006.01)
*F02F 3/00* (2006.01)
(Continued)

(52) U.S. Cl.
CPC .............. *F02F 3/22* (2013.01); *F01P 3/06* (2013.01); *F02B 23/0672* (2013.01);
(Continued)

(58) Field of Classification Search
CPC ...... F02F 3/22; F02F 3/26; F02F 3/225; F02F 3/16; F02F 3/027; F02F 2003/0007;
(Continued)

(56) References Cited

U.S. PATENT DOCUMENTS 1,387,593 A  8/1921  Crispin
1,670,549 A  5/1928  Pearce
(Continued)

FOREIGN PATENT DOCUMENTS

EP    1085195 A2    3/2001
SU    1204767 A1    1/1986
WO    2016070031 A1    5/2016

OTHER PUBLICATIONS

International Search Report, dated Jun. 16, 2017 (PCT/US2017/020638).

*Primary Examiner* — George C Jin
(74) *Attorney, Agent, or Firm* — Robert L. Stearns; Dickinson Wright, PLLC

(57) ABSTRACT

A galleryless piston having a reduced weight and a reduced operating temperature is provided. The piston includes an undercrown surface exposed from an underside of the piston, a ring belt, pin bosses each presenting a pin bore, and skirt panels depending from the ring belt and coupled to the pin bosses by strut. The piston further includes an inner undercrown region extending along the undercrown surface and surrounded by the skirt panels, the struts, and the pin bosses. The piston also includes outer pockets each extending along the undercrown surface and each surrounded by a portion of the ring belt, one of the pin bosses, and the struts coupling the one pin boss to the skirt panels. Cutouts are located in the pin bosses above the pin bores to increase the area of the undercrown surface and thus allow cooling oil to remove more heat from the undercrown surface.

17 Claims, 4 Drawing Sheets

(51) Int. Cl.
*F02F 3/22* (2006.01)
*F02F 3/26* (2006.01)
*F02B 23/06* (2006.01)
*F01P 3/08* (2006.01)

(52) U.S. Cl.
CPC ............ *F02B 23/0696* (2013.01); *F02F 3/26* (2013.01); *F01P 3/08* (2013.01); *F02F 3/0076* (2013.01); *F02F 2003/0007* (2013.01); *F02F 2200/04* (2013.01); *F02F 2200/06* (2013.01)

(58) Field of Classification Search
CPC .. F02F 2200/04; F02F 2200/06; F02F 3/0076; F01P 3/06; F01P 3/08; F01P 3/10; F02B 23/0672; F02B 23/0696
See application file for complete search history.

(56) References Cited

U.S. PATENT DOCUMENTS

| | | |
|---|---|---|
| 2,860,934 A | 11/1958 | Trevarthen |
| 3,257,997 A | 6/1966 | Sheaffer |
| 3,992,980 A | 11/1976 | Ryan et al. |
| 6,435,077 B1 | 8/2002 | Damour et al. |
| 7,997,249 B2 | 8/2011 | Matsui et al. |
| 8,544,441 B2 | 10/2013 | Azevedo |
| 8,869,768 B2 | 10/2014 | Azevedo |
| 2002/0124401 A1* | 9/2002 | Huang ..................... B21K 1/18 29/888.04 |
| 2002/0139322 A1* | 10/2002 | Murglin ................... F01M 1/08 123/41.35 |
| 2003/0075042 A1 | 4/2003 | Gaiser et al. |
| 2009/0013531 A1* | 1/2009 | Heraldo ................... B21K 1/18 29/888.04 |
| 2010/0299922 A1 | 12/2010 | Gniesmer et al. |
| 2012/0037112 A1* | 2/2012 | Muscas ..................... F02F 3/003 123/193.6 |
| 2013/0233270 A1 | 9/2013 | Brandt et al. |
| 2014/0020648 A1* | 1/2014 | Azevedo ................... F16J 9/062 123/193.6 |
| 2015/0122212 A1* | 5/2015 | Riffe ......................... F02F 3/00 123/193.4 |
| 2016/0123274 A1 | 5/2016 | Miller et al. |

\* cited by examiner

GALLERYLESS PISTON WITH CUTOUT ABOVE PIN BORE

CROSS-REFERENCE TO RELATED APPLICATION

This U.S. utility patent application claims priority to U.S. provisional patent application No. 62/305,419, filed Mar. 8, 2016, the contents of which is incorporated herein by reference in its entirety.

BACKGROUND OF THE INVENTION

1. Technical Field

This invention relates generally to pistons for internal combustion engines, and methods of manufacturing the pistons.

2. Related Art

Engine manufacturers are encountering increasing demands to improve engine efficiencies and performance, including, but not limited to, improving fuel economy, reducing oil consumption, improving fuel systems, increasing compression loads and operating temperatures within the cylinder bores, reducing heat loss through the piston, improving lubrication of component parts, decreasing engine weight and making engines more compact, while at the same time decreasing the costs associated with manufacture.

While desirable to increase the compression load and operation temperature within the combustion chamber, it remains necessary to maintain the temperature of the piston within workable limits. Also, achieving an increase in the compression load and operation temperature comes with a tradeoff in that these desirable "increases" limit the degree to which the piston compression height, and thus, overall piston size and mass can be decreased. This is particularly troublesome with typical piston constructions having a closed or partially closed cooling gallery to reduce the operating temperature of the piston. The cost to manufacture pistons having upper and lower parts joined together along a bond joint to form the closed or partially closed cooling gallery is generally increased due to the joining process used to bond the upper and lower parts together. Further, the degree to which the engine weight can be reduced is impacted by the need to make the aforementioned "cooling gallery-containing" pistons from steel so they can withstand the increase in mechanical and thermal loads imposed on the piston.

Recently, single piece steel pistons without a cooling gallery have been developed and can be referred to as "galleryless" pistons. Such pistons provide for reduced weight, reduced manufacturing costs, and reduced compression height. The galleryless pistons are either spray cooled by a cooling oil nozzle, lightly sprayed for lubrication only, or are not sprayed with any oil. Due to the absence of the cooling gallery, such pistons typically experience higher temperatures than pistons with a conventional cooling gallery. High temperatures can cause oxidation or overheating of an upper combustion surface of the steel piston, which can then cause successive piston cracking and engine failures. High temperatures can also cause oil degradation along an undercrown area of the piston, for example underneath a combustion bowl where the cooling or lubrication oil is sprayed. Another potential problem arising due to high temperatures is that the cooling oil can create a thick layer of carbon in the area where the cooling or lubrication oil is in contact with the piston undercrown. This carbon layer can cause overheating of the piston with potential cracking and engine failure.

SUMMARY

One aspect of the invention provides a piston including an upper wall including an undercrown surface exposed from an underside of said piston. The piston also includes a ring belt depending from the upper wall and extending circumferentially around a center axis of the piston, and a pair of pin bosses depending from the upper wall, wherein each of the pin bosses presents a pin bore. A pair of skirt panels depend from the ring belt and are coupled to the pin bosses by struts. The piston further includes an inner undercrown region which extends along the undercrown surface and is surrounded by the skirt panels and the struts and the pin bosses. A pair of outer pockets extends along the undercrown surface, and each outer pocket is surrounded by a portion of the ring belt, one of the pin bosses, and the struts coupling the one pin boss to the skirt panels. The piston also includes at least one cutout in at least one of the pin bosses, and the at least one cutout is located above at least one of the pin bores.

Another aspect of the invention provides a method of manufacturing a piston. The method includes the step of providing a body including an upper wall, the upper wall including an undercrown surface exposed from an underside of the piston, a ring belt depending from the upper wall and extending circumferentially around a center axis of the piston, a pair of pin bosses depending from the upper wall, each of the pin bosses presenting a pin bore, a pair of skirt panels depending from the ring belt and coupled to the pin bosses by struts, an inner undercrown region extending along the undercrown surface and surrounded by the skirt panels and the struts and the pin bosses, a pair of outer pockets extending along the undercrown surface, each outer pocket being surrounded by a portion of the ring belt and one of the pin bosses and the struts coupling the one pin boss to the skirt panels. The method further includes forming at least one cutout in at least one of the pin bosses above at least one of the pin bores.

BRIEF DESCRIPTION OF THE DRAWINGS

These and other aspects, features and advantages of the invention will become more readily appreciated when considered in connection with the following detailed description and accompanying drawings, in which.

DETAILED DESCRIPTION OF EXEMPLARY EMBODIMENTS

FIGS. 1-6 illustrate views of a galleryless piston 10, 110 constructed in accordance with example embodiments of the invention for reciprocating movement in a cylinder bore or chamber (not shown) of an internal combustion engine, such as a modern, compact, high performance vehicle engine, for example. The piston 10, 110 has a reduced weight and operates at a reduced temperature in an internal combustion engine, which contributes to improved thermal efficiency, fuel consumption, and performance of the engine.

Figure 1:
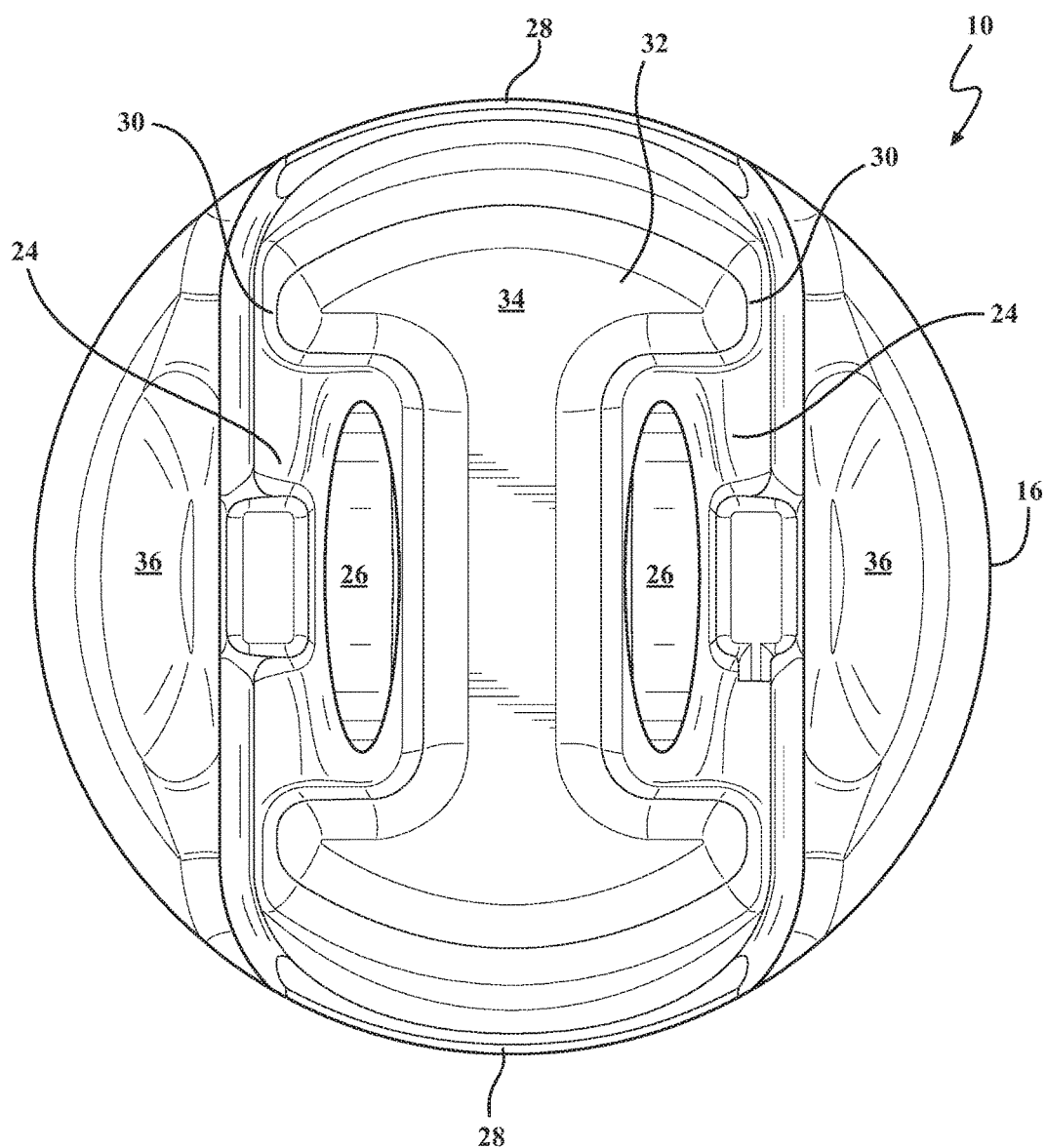
FIG. 1 is a bottom view of a galleryless piston which can include cutouts above pin bores according to an example embodiment.
Figure 2:
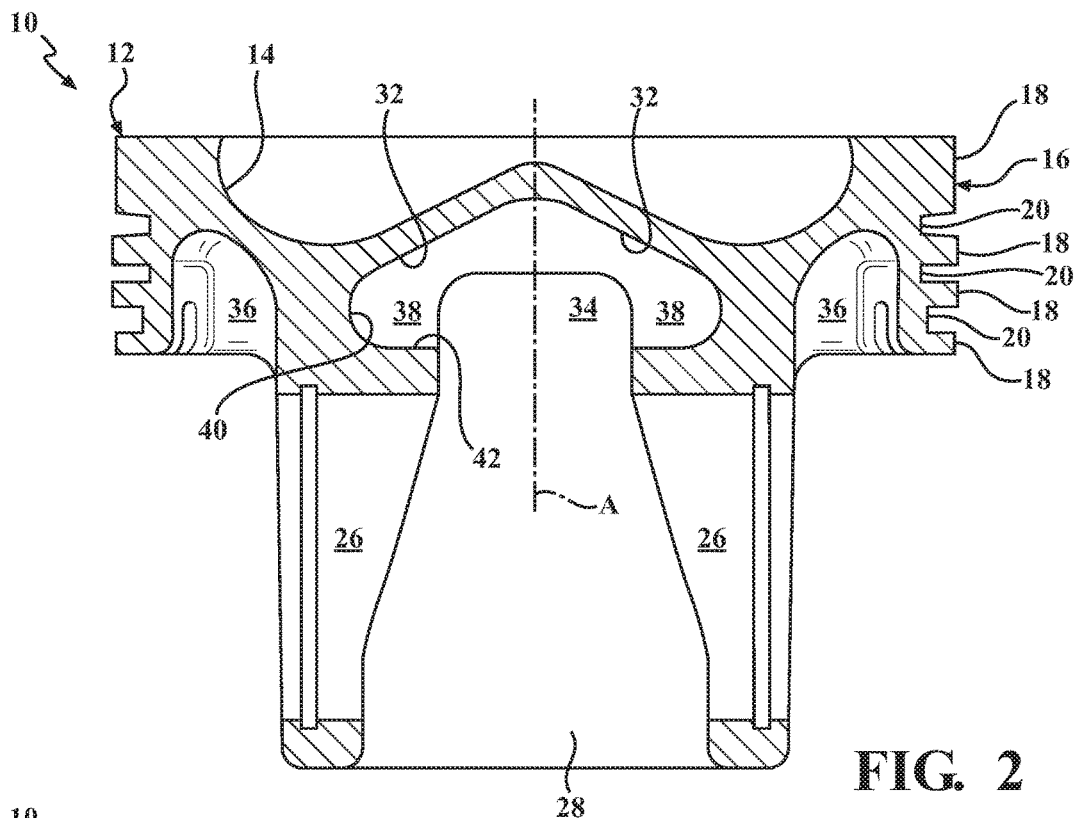
FIG. 2 is a side cross-sectional view of a galleryless piston including the cutouts above the pin bores according to an example embodiment.

As shown in the Figures, the piston 10, 110 has a monolithic body formed from a single piece of metal material, such as steel. The monolithic body can be formed by machining, forging or casting, with possible finish machining performed thereafter, if desired, to complete construction. Accordingly, the piston 10, 100 does not have a plurality of parts joined together, such as upper and lower parts joined to one another, which is commonplace with pistons having enclosed or partially enclosed cooling galleries bounded or partially bounded by a cooling gallery floor. To the contrary, the piston 10, 110 is "galleryless" in that it does not have a cooling gallery floor or other features bounding or partially bounding a cooling gallery. Thus, the piston 10, 110 has a reduced weight and related costs, relative to pistons including a closed cooling gallery. A bottom view of the galleryless piston 10 is shown in FIG. 1, and a cross-sectional side view of the galleryless piston 10 according to another embodiment is shown in FIG. 2. FIGS. 1-6 are side cross-sectional views of the galleryless piston, 10, 110 according to other example embodiments.

The body portion, being made of steel or another metal, is strong and durable to meet the high performance demands, i.e. increased temperature and compression loads, of modern day high performance internal combustion engines. The steel material used to construct the body can be an alloy such as the SAE 4140 grade or different, depending on the requirements of the piston 10, 110 in the particular engine application. Due to the piston 10, 110 being galleryless, the weight and compression height of the piston 10, 110 is minimized, thereby allowing an engine in which the piston 10, 110 is deployed to achieve a reduced weight and to be made more compact. Further yet, even though the piston 10 is galleryless, the piston 10, 110 can be sufficiently cooled during use to withstand the most severe operating temperatures.

The body portion of the piston 10, 110 has an upper head or top section providing an upper wall 12, 112. The upper wall 12, 112 includes an upper combustion surface 14, 114 that is directly exposed to combustion gasses within the cylinder bore of the internal combustion engine. In the example embodiment, the upper combustion surface 14, 114 forms a combustion bowl, or a non-planar, concave, or undulating surface around a center axis A.

A ring belt 16, 116 depends from the upper wall 12, 112 and extends circumferentially along an outer diameter of the piston 10, 110. The ring belt 16, 116 includes a plurality of lands 18, 118 separated from one another by ring grooves 20, 120. The piston 10, 110 of the example embodiments includes three ring grooves 20, 120, but the piston 10, 110 could alternatively include another number of ring grooves 20, 120.

The piston 10, 110 further includes a pair of pin bosses 24, 124 depending generally from an undercrown surface 32, 132, inwardly of the ring belt 16, 116. The pin bosses 24, 124 provide a pair of laterally spaced pin bores 26, 126 which are vertically spaced from the undercrown surface 32, 132. The piston 10, 110 also includes a pair of skirt panels 28, 128 depending from the ring belt 16, 116 and located diametrically opposite one another. The skirt panels 28, 128 are coupled to the pin bosses 24, 125 by struts 30, 130.

The undercrown surface 32, 132 of the piston 10, 110 is formed on an underside of the upper wall 12, 112, directly opposite the upper combustion surface 14, 114 and radially inwardly of the ring belt 16, 116. The undercrown surface 32, 132 is preferably located at a minimum distance from the combustion bowl and is substantially the surface on the direct opposite side from the combustion bowl. The undercrown surface 32, 132 is defined here to be the surface that is visible, excluding any pin bores 26, 126 when observing the piston 10, 110 straight on from the bottom. The undercrown surface 32, 132 is generally form fitting to the combustion bowl of the upper combustion surface 14, 114. The undercrown surface 32, 132 is also openly exposed, as viewed from an underside of the piston 10, 110, and it is not bounded by an enclosed or partially enclosed cooling gallery, or any other features tending to retain oil or a cooling fluid near the undercrown surface 32, 132.

The undercrown surface 32, 132 of the piston 10, 110 has greater a total surface area (3-dimensional area following the contour of the surface) and a greater projected surface area (2-dimensional area, planar, as seen in plan view) than comparative pistons having a closed or partially closed cooling gallery. This open region along the underside of the piston 10, 110 provides direct access to oil splashing or being sprayed from within the crankcase directly onto the undercrown surface 32, 132, thereby allowing the entire undercrown surface 32, 132 to be splashed directly by oil from within the crankcase, while also allowing the oil to freely splash about the wrist pin (not shown), and further, significantly reduce the weight of the piston 10, 110. Accordingly, although not having a typical closed or partially closed cooling gallery, the generally open configuration of the galleryless piston 10, 110 allows optimal cooling of the undercrown surface 32, 132 and lubrication to the wrist pin joint within the pin bores 26, 126, while at the same time reducing oil residence time on the surfaces near the combustion bowl, which is the time in which a volume of oil remains on the surface. The reduced residence time can reduce unwanted build-up of coked oil, such as can occur in pistons having a closed or substantially closed cooling gallery. As such, the piston 10, 110 can remain "clean" over extended use, thereby allowing it to remain substantially free of build-up.

The undercrown surface 32, 132, of the piston 10, 110 of the example embodiment is provided by several regions of the piston 10, 110 including an inner undercrown region 34, 134 and outer pockets 36, 136, which are best shown in FIG. 1. A first portion of the undercrown surface 32, 132 located at the center axis A is provided by the inner undercrown region 34, 134. The inner undercrown region 34, 134 is surrounded by the pin bosses 24, 124, skirt panels 28, 128, and struts 30, 130. The 2-dimensional and 3-dimensional surface area of the undercrown surface 32, 132 provided by the inner undercrown region 34, 134 is typically maximized so that cooling caused by oil splashing or being sprayed upwardly from the crankcase against the exposed surface can be enhanced, thereby lending to exceptional cooling of the piston 10, 110. In the example embodiments, the undercrown surface 32, 132 of the inner undercrown region 34, 134 is concave, when viewed from the bottom, such that oil can be channeled during reciprocation of the piston 10, 110 from one side of the piston 10, 110 to the opposite side of the piston 10, 110, thereby acting to further enhance cooling of the piston 10, 110.

A second region of the undercrown surface 32, 132 is provided by the outer pockets 36, 136 which are located outwardly of the pin bosses 24, 124. Each outer pocket 36, 136 is surrounded by one of the pin bosses 24, 124, portions of the struts 30, 130 connecting the one pin boss 24, 124 to the skirt panels 28, 128, and a portion of the ring belt 16, 116.

To further reduce weight and improve cooling of the galleryless piston 10, 110 compared to galleryless pistons having other designs, the piston 10, 110 includes at least one cutout 38, 138, 138' located above at least one of the pin bores 26, 126, and preferably includes the cutout 38, 138, 138' above both pin bores 26, 126. Each cutout 38, 138, 138' is spaced from the combustion surface 14, 114 and from the pin bore 26, 126 by a portion of the steel body portion. In addition to reducing the mass of the piston 10, 110, the cutout also increases the area of the undercrown surface 32, 132, thus allowing cooling oil to remove more heat from the undercrown surface 32, 132 during operation in an internal combustion engine.

Figure 3:
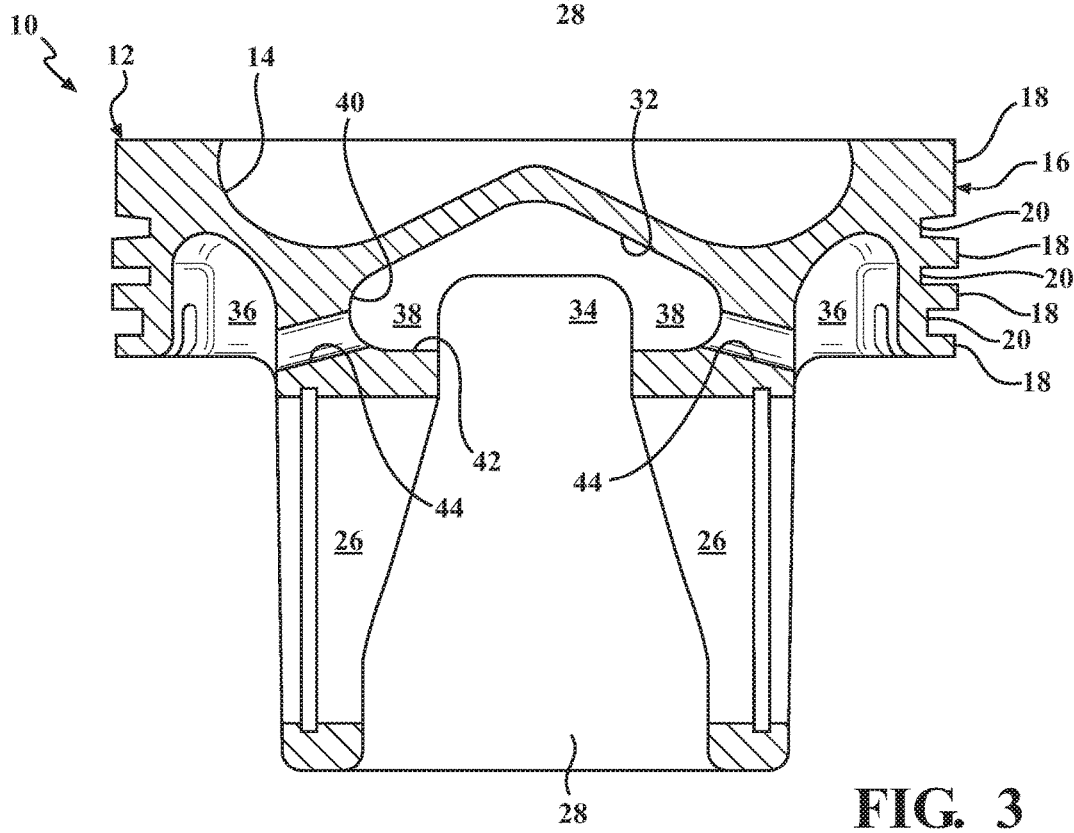
FIG. 3 is a side cross-sectional view of a galleryless piston including the cutouts above the pin bores, wherein each cutout includes a hole extending from an inner undercrown region to an outer pocket according to another example embodiment.
Figure 4:
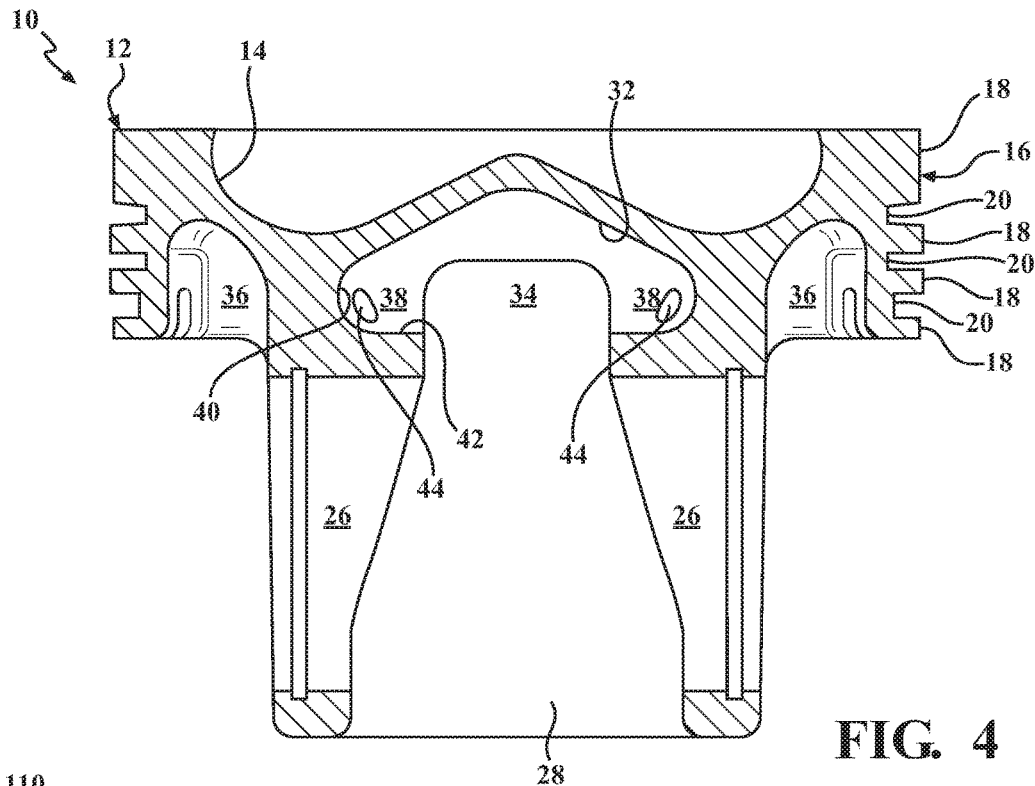
FIG. 4 is another side cross-sectional view of a galleryless piston according to another example embodiment, wherein each cutout includes two holes extending from an inner undercrown region to an outer pocket and in which the axis of the holes is at an angle with respect to the plane of cross-section.

In the embodiments of FIGS. 2-4, the piston 10 includes two cutouts 38, and one of the cutouts 38 is located above each pin boss 26. In this embodiment, the cutouts 38 are referred to as inner cutouts and are open to the inner undercrown region 34. Each inner cutouts 38 of this embodiment extends radially outwardly from the center axis A to a location above the pin bore 26 spaced from one of the outer pockets 36. The shape of the inner cutouts 38 can vary depending on the shape of the piston 10. In the example embodiments of FIGS. 2-4, each inner cutout 38 includes a concave surface 40 located above the pin bore 26 and facing the center axis A of the piston 10. The undercrown surface 32 of the piston 10 extends outwardly from the center axis A to an uppermost surface of the cutouts 38. Thus, the inner cutouts 38 increase the surface area accessible by cooling oil to remove more heat from the piston 10. The cutouts 38 also include a base surface 42 facing the undercrown surface 32 and extending from the concave surface 40 toward the center axis A, generally parallel to the pin bore 26.

In the embodiment of FIG. 2, despite the inner cutouts 38, the inner undercrown region 34 is still separated from the outer pockets 36 of the piston 10 by the steel material located above the pin bore 26. However, in the example embodiment of FIGS. 3 and 4, each inner cutout 38 further includes at least one hole 44, for example two holes 44, extending from the concave surface 40 along the inner undercrown region 34 to one of the outer pockets 36. The holes 44 allow oil to pass from the inner undercrown region 34 to the outer pockets 36, and thus improve cooling of the outer pockets 36 during operation. The holes 44 can have various different shapes, for example each hole 44 can have a cylindrical shape extending at a slight downward angle from the inner undercrown region 34 to the outer pocket 36, as shown in FIGS. 3 and 4. According to another embodiment, the holes 44 extend at a slight downward angle from the inner undercrown region 34 to the outer pockets 36.

According to yet another embodiment, the holes 44 extend straight (perpendicular to the center axis A) from the inner undercrown region 34 to the outer pockets 36.

Due to the cutouts 38, 138, 138' the piston 10, 110 includes a reduced amount of material above the pin bores 26, 126. In the example embodiments of FIGS. 2-4, a radial width w of the material remaining above each pin bore 26 between the concave surface 40 of each inner cutout 38 and the adjacent outer pocket 36 is at least 2.5% of the maximum outer diameter of the piston 10 or at least 3% of the maximum outer diameter of the piston 10. The volume of each inner cutout 38 varies depending on the volume of the piston 10 and depending on whether the inner cutout 38 includes the hole 44 allowing cooling oil to pass to the adjacent outer pocket 36. In the example embodiment of FIG. 2, without the hole 44, each inner cutout 38 is formed by removing a fraction of the volume of the steel body portion located between the pin bore 26 and the combustion surface 14. The holes 44 could be at angles upward from the inner undercrown region 34 to the outer pockets 36, or at angles downward from the inner undercrown region 34 to the outer pockets 36 as well.

In the example embodiment of FIGS. 3 and 4, with the hole 44, each inner cutout 38 is formed by removing a larger fraction of the volume of the steel body portion located between the pin bore 26 and the combustion surface 14. The volume of the hole 44 is a fraction of the volume of the entire inner cutout 38. In the example embodiments, the cross-sectional area of each hole is between 10 mm$^2$ and 150 mm$^2$.

Figure 5:
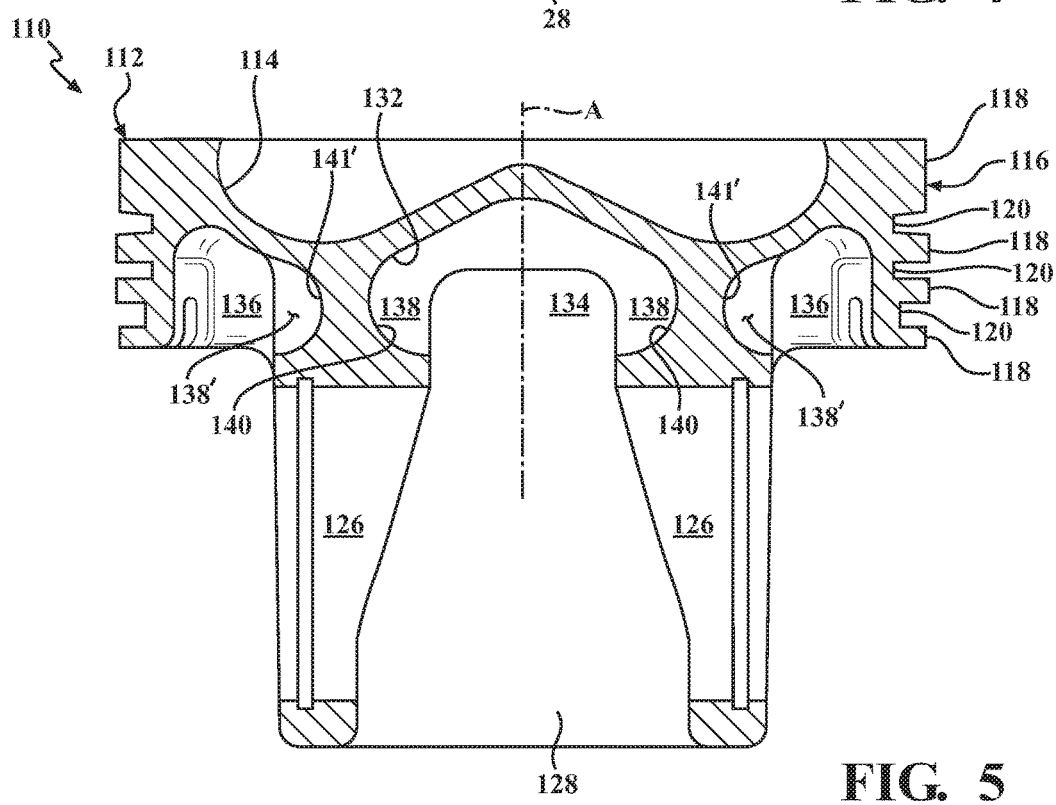
FIG. 5 is a side cross-sectional view of a galleryless piston according to another example embodiment, wherein the piston includes cutouts on both sides of each pin bore.
Figure 6:
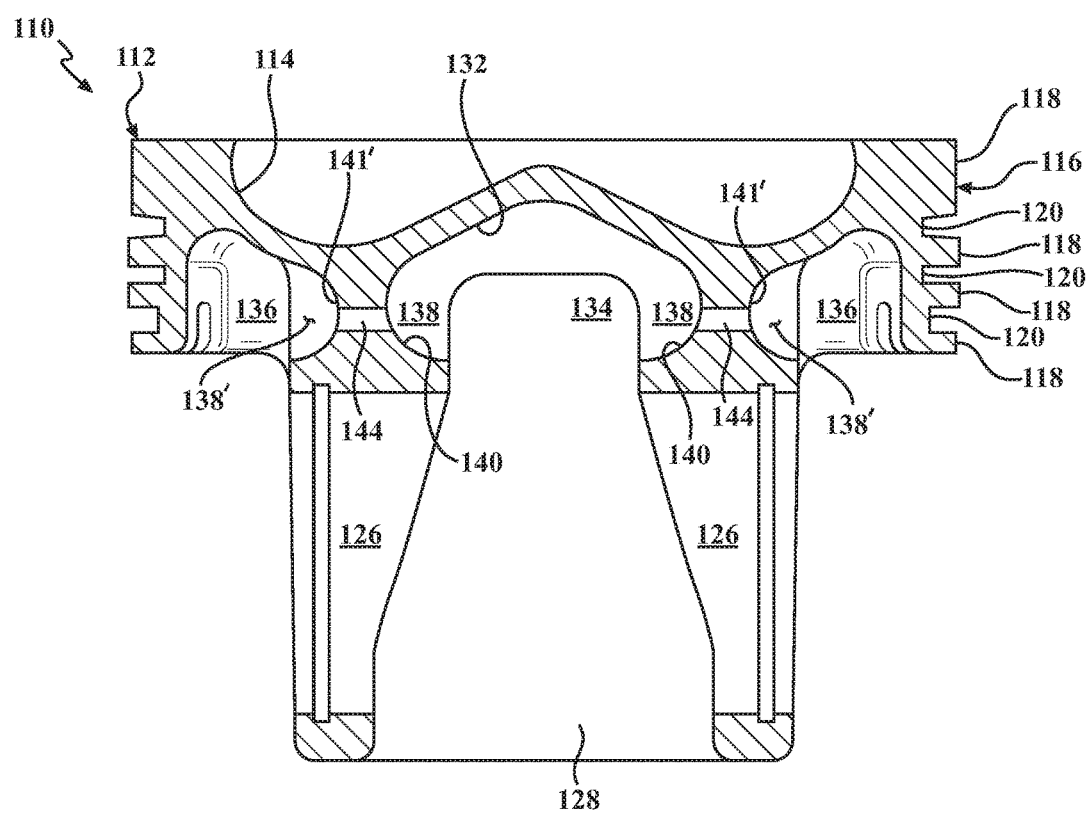
FIG. 6 is a side cross-sectional view of a galleryless piston including the cutouts above the pin bores according to yet another example embodiment, wherein the hole extends through a ring groove, the adjacent outer pocket, and into inner undercrown region.

According to another example embodiment, the reduced temperature and mass of the piston 110 is achieved by providing the cutouts 138, 138' on both sides of the pin boss 124, as shown in FIGS. 5 and 6. The inner cutouts 138 are formed by removing material along the inner undercrown region 134, as in the embodiments of FIGS. 2-4. An outer cutout 138' is formed above each pin bore 126 by removing material along the outer pockets 136. Thus, each outer cutout 138' is open to one of the outer pockets 136 and extends radially toward the center axis A of the piston 110. By removing the material from both sides of the pin bore 124, the remaining material can be strategically placed over the pin bore 126.

In the embodiments in FIGS. 5 and 6, each cutout 138, 138' again includes a concave surface 140, 140' located above the pin boss 126. The concave surface 140 of the inner cutout 138 faces the center axis A of the piston 110, and the concave surface 141' of the outer cutout 138' faces the outer pocket 138 and the ring belt 116 of the piston 110. The undercrown surface 132 of the piston 110 in the inner undercrown region 134 extends outwardly from the center axis A to the uppermost surface of the inner cutouts 138, and the undercrown surface 134 of the piston 110 in the outer pockets 138' extends inwardly toward the center axis A to the uppermost surface of the outer cutouts 138'. Thus, the inner cutout 138 and the outer cutout 138' increase the surface area accessible by cooling oil to remove more heat from along the piston 10. Each cutout 138, 138' can also include a base surface 142, 142' facing the undercrown surface 132. The base surfaces 142 of the inner cutouts 138 extend from the concave surfaces 140 toward the center axis A. The base surface 142' of the outer cutouts 138' extend from the concave surface 140' away from the center axis A.

In the embodiment of FIG. 5, despite the cutouts 138, 138', the inner undercrown region 134 is still separated from the outer pockets 136 of the piston 110 by the steel material located above the pin bore 126. However, in the example embodiment of FIG. 6, each pin boss 126 of the piston 110 includes one of the holes 144 extending from the inner undercrown region 134 and inner cutout 138 to the outer pockets 136 and the outer cutout 138'. The holes 144 allow oil to pass from the inner undercrown region 134 to the outer pockets 136, and thus improve cooling of the outer pockets 136 during operation.

The holes 144 of the embodiment shown in FIG. 6 can have varies shapes. For example, each hole 144 can have a cylindrical shape extending at a slight downward angle from the inner undercrown region 134 to the outer pocket 136, a slight upward angle from the inner undercrown region 134 to the outer pocket 136, or straight (perpendicular to the center axis A) from the inner undercrown region 134 to the outer pocket 136. Preferably, each hole 144 extends at an downward angle from the inner undercrown region 134 to the adjacent outer pocket 136.

Also in the embodiment of FIG. 6, the hole 144 extend through a back wall of the third ring groove 120 of the ring belt 116, through the outer pocket 136, and into the inner undercrown region 134. In this case, the portion of the hole 144 extending through the ring belt 116 serves as an oil drainage feature, and the portion of the hole 144 located above the pin boss 124 serves as a passage for oil from the inner undercrown region 134 to the outer pocket 136.

Due to the cutouts 138, 138', which can include the hole 144, the piston 110 includes a reduced amount of material above the pin bores 126. In the example embodiments of FIGS. 5 and 6, the radial width w of the material remaining above each pin bore 126 between the concave surface 140 of the inner cutout 138 and the outer cutout 138' is at least 2.5% of the maximum outer diameter of the piston 110 or at least 3% of the maximum outer diameter of the piston 110, and the cross-sectional area of each hole is between 10 mm$^2$ and 150 mm$^2$.

The pistons 10, 110 designed according to the present invention are able to achieve a reduced temperature during operation in an internal combustion engine, as well as a reduced mass, compared to a galleryless pistons without the cutouts 38, 138, 138'. Cooling of the outer pockets 36, 136 can be further improved by the holes 44, 144 allowing cooling oil to travel from the inner undercrown region 34, 134 to the outer pockets 36, 136.

Another aspect of the invention provides a method of manufacturing the galleryless piston 10, 110 for use in the internal combustion engine. The body portion of the piston 10, 110, which is typically formed of steel, can be manufactured according to various different methods, such as forging or casting. The body portion of the galleryless piston 10, 110 can also comprise various different designs, and example designs are shown in FIGS. 1-6.

The method further includes providing the piston 10, 110 with at least one cutout 38, 138, 138', and preferably at least one cutout 38, 138, 138' above each pin bore 26, 126. The cutouts 38, 138, 138' can be formed during the process of casting or otherwise forming the monolithic body portion of the piston 10, 110. Alternatively, the cutouts 38, 138, 138' can be formed by machining or cutting into the body portion after casting or otherwise forming the monolithic body portion of the piston 10, 110. The holes 44, 144 can be formed at the same time as the rest of the cutout 38, 138, 138', such as during the casting step, or in another step. For example the holes 44, 144 can be drilled into the body portion to connect the inner undercrown region 34, 134 to the outer pockets 36, 136 after casting the body portion. In the embodiment of FIG. 6, the holes 144 are drilled through the third ring groove 120 of the ring belt 116, through the outer pocket 136, and into the inner undercrown region 134 of the piston 110.

Many modifications and variations of the present invention are possible in light of the above teachings and may be practiced otherwise than as specifically described while within the scope of the following claims. It is contemplated that all features of all claims and of all embodiments can be combined with each other, so long as such combinations would not contradict one another.

The invention claimed is:

1. A piston, comprising:
an upper wall including an undercrown surface exposed from an underside of said piston,
a ring belt depending from said upper wall and extending circumferentially around a center axis of said piston,
a pair of pin bosses depending from said upper wall,
each of said pin bosses presenting a pin bore,
a pair of skirt panels depending from said ring belt and coupled to said pin bosses by struts,
an inner undercrown region extending along said undercrown surface and surrounded by said skirt panels and said struts and said pin bosses,
a pair of outer pockets extending along said undercrown surface,
each outer pocket being surrounded by a portion of said ring belt and one of said pin bosses and said struts coupling said one pin boss to said skirt panels, and
at least one cutout in at least one of said pin bosses,
said at least one cutout being located above at least one of said pin bores,
said at least one cutout including two inner cutouts,
each one of said inner cutouts being open to said inner undercrown region,
each one of said inner cutouts extending radially outwardly from said center axis to a location above one of said pin bores,
each one of said inner cutouts including a concave surface located above said pin bore and facing said center axis of said piston,
said undercrown surface extending radially outwardly from said center axis to an uppermost surface of each of said inner cutouts,
each one of said inner cutouts including a base surface facing said undercrown surface and extending from said concave surface toward said center axis,
said concave surface of each one of said inner cutouts being spaced radially from one of said outer pockets by material of said body, and
each one of said inner cutouts being completely spaced radially from one of said outer pockets by said material of said body.

2. The piston of claim 1 including a body, wherein said body includes said upper wall and said ring belt and said pin bosses and said skirt panels and said struts, said upper wall presents an upper combustion surface, and each of said cutouts is spaced from said upper combustion surface and said pin boss by material of said body.

3. The piston of claim 2, wherein a radial width of material of said body remaining above each pin bore between one of said cutouts and one of said outer pockets is at least 2.5% of a maximum outer diameter of said piston.

4. The piston of claim 1, wherein said piston includes a body formed of a single piece of steel, said body includes said upper wall, said ring belt, said pin bosses, and said skirt panels.

5. The piston of claim 1, wherein each one of said inner cutouts further includes a hole extending from said concave surface to one of said outer pockets.

6. The piston of claim 5, wherein said holes extend at a downward angle from said inner undercrown region to said outer pockets.

7. The piston of claim 5, wherein said holes extend straight from said inner undercrown region to said outer pockets.

8. The piston of claim 5, wherein each one of said holes has a cross-sectional area between 10 mm$^2$ and 150 mm$^2$.

9. The piston of claim 1, wherein said at least one cutout further includes two outer cutouts, each one of said outer cutouts is open to one of said outer pockets and extends radially toward said center axis to a location above one of said pin bores, each one of said outer cutouts includes a concave surface located above said pin bore and facing one of said outer pockets, said undercrown surface along said outer pockets extends inwardly to an uppermost surface of each of said outer cutouts, each one of said outer cutouts includes a base surface facing said undercrown surface and extending from said concave surface away from said center axis, and said concave surface of each one of said outer cutouts is spaced from said inner undercrown region by said material of said body.

10. The piston of claim 9, wherein each of said pin bosses includes a hole extending from said inner cutout to said outer cutout.

11. The piston of claim 10, wherein said holes extend at a downward angle or straight from said inner cutout to said outer cutout.

12. The piston of claim 10, wherein each one of said holes has a cross-sectional area between 10 mm$^2$ and 150 mm$^2$.

13. The piston of claim 10, wherein each one of said holes further extends through a back wall of one of said ring grooves and into one of said outer pockets.

14. The piston of claim 1, wherein said piston does not include a cooling gallery floor or other feature bounding or partially bounding a cooling gallery.

15. The piston of claim 1 including a body formed of a single piece of material,
said material of said body is steel,
said body does not have a cooling gallery floor or other features bounding or partially bounding a cooling gallery,
said body includes said upper wall presenting an upper combustion surface,
said upper combustion surface is a non-planar surface around said center axis,
said ring belt includes a plurality of ring grooves spaced from one another by lands extending circumferentially around said center axis and along an outer diameter of said piston,
said pin bosses are disposed inwardly of said ring belt,
said pin bores are laterally spaced from one another and surround a pin bore axis,
said pair of skirt panels are located diametrically opposite one another,
said undercrown surface is disposed radially inwardly of said ring belt,
said undercrown surface is not bounded by an enclosed or partially enclosed cooling gallery or any other feature tending to retain fluid, a first portion of said undercrown surface is provided by said inner undercrown region and a second portion of said undercrown surface is provided by said outer pockets,
said inner undercrown region is located at said center axis and is surrounded by said pin bosses and said skirt panels and said struts,
said undercrown surface located in said inner undercrown region is concave when viewed from the bottom of said piston,
said outer pockets are located outwardly of said pin bosses,
said at least one cutout includes a plurality of said cutouts each spaced from said combustion surface and from one of said pin bores by said steel of said body, and
a radial width of said steel of said body remaining above each pin bore between said concave surface of one of said inner cutouts and an adjacent one of said outer pockets is at least 2.5% of a maximum outer diameter of said piston.

16. A method of manufacturing a piston, comprising the steps of:
providing a body including an upper wall, the upper wall including an undercrown surface exposed from an underside of the piston, a ring belt depending from the upper wall and extending circumferentially around a center axis of the piston, a pair of pin bosses depending from the upper wall, each of the pin bosses presenting a pin bore, a pair of skirt panels depending from the ring belt and coupled to the pin bosses by struts, an inner undercrown region extending along the undercrown surface and surrounded by the skirt panels and the struts and the pin bosses, a pair of outer pockets extending along the undercrown surface, each outer pocket being surrounded by a portion of the ring belt and one of the pin bosses and the struts coupling the one pin boss to the skirt panels, and
forming at least one cutout in at least one of the pin bosses above at least one of the pin bores, the at least one cutout including two inner cutouts, each one of the inner cutouts being open to the inner undercrown region, each one of the inner cutouts extending radially outwardly from the center axis to a location above one of the pin bores, each one of the inner cutouts including a concave surface located above the pin bore and facing the center axis of the piston, the undercrown surface extending radially outwardly from the center axis to an uppermost surface of each of the inner cutouts, each one of the inner cutouts including a base surface facing the undercrown surface and extending from the concave surface toward the center axis, the concave surface of each one of the inner cutouts being spaced radially from one of the outer pockets by material of the body, and each one of the inner cutouts being completely spaced radially from one of the outer pockets by the material of the body.

17. The method of claim 16, wherein the body is a single piece of material, the step of providing the body includes forging or casting the body, and the cutouts are formed during the casting or forging step or the cutouts are formed after the casting or forging step by machining or cutting.

* * * * *